Feb. 9, 1971 W. BERGMANN 3,561,095

METHOD OF FORMING A COUPLING BETWEEN A FITTING AND TUBE

Filed June 18, 1968

Inventor

WILHELM BERGMANN

BY

McGregor and Eisenman

ATTORNEYS

United States Patent Office 3,561,095
Patented Feb. 9, 1971

3,561,095
METHOD OF FORMING A COUPLING BETWEEN A FITTING AND TUBE
Wilhelm Bergmann, Hamburg, Germany, assignor to Eppendorf Geraetebau Netheler & Hinz GmbH, Hamburg, Germany, a corporation
Filed June 18, 1968, Ser. No. 744,274
Claims priority, application Germany, June 20, 1967, P 12 85 814.9–12
Int. Cl. B23p *11/02*
U.S. Cl. 29—451                    8 Claims

ABSTRACT OF THE DISCLOSURE

This coupling is formed between an undersized bore in a substantially rigid fitting and an elastic tube having an outside diameter larger than the bore. A portion of the tube is deformed to facilitate insertion into the bore, and the oversized portion is then pulled through.

BACKGROUND OF THE INVENTION

The invention is concerned with sealed couplings between flexible elastic tubes and fittings having a substantially cylindrical bore. In the past, gland type arrangements have been used for attaching flexible tube to the bore in a fitting. In addition, cap nuts have been employed to accomplish such couplings; and frequently, packing was used in such couplings, or an elastic part, such as the end of the tube, was pressed directly by a cap nut or a corresponding element against a counterface.

These prior techniques are all relatively expensive and the joints are subject to deterioration with age. Moreover, most known packings are not suitable for exposure to all chemicals. For example, it is not always possible to use conventional rubber packing.

SUMMARY OF THE INVENTION

The present invention relates to couplings between flexible tubes and substantially rigid fittings. More particularly, it relates to a method for coupling flexible tube into the bore of a fitting and to the unit thus formed.

A basic object of the invention is to provide an improved method for developing a sealed coupling between flexible tubing and a rigid fitting.

Another object of the invention is to provide an improved method for coupling flexible tubing to a fitting which involves low cost and minimum preparation of the individual parts.

Another object of the invention is to provide an improved coupling arrangement that has high strength and long effective life.

Another object of the invention is to provide an improved coupling that is relatively simple and economical to produce.

Another object of the invention is to provide an improved coupling between flexible tube and a rigid fitting that presents the same stability to chemicals as the material of the flexible tube itself.

Another object of the invention is to provide a packing-free arrangement in which the outer circumference of a flexible tube is arranged directly in an advantageously profiled undersized bore.

According to the invention, the bore of the fitting is made undersize in relation to the outside diameter of the tube. To form the coupling, one end of the tube is stretched beyond its elastic limit and is permanently deformed to a smaller diameter than the bore. Then the deformed end is passed through the bore, and the following undeformed tube section is pulled through the bore. Finally, the extending end with the deformed section is cut off. This produces an absolutely secure coupling without using any other auxiliary means, and it may well include deforming elastically only the undeformed tube section during introduction into the bore. Advantageously, materials are used which do not exceed their elastic limit within the range of the stresses encountered.

After removal of the tension load, the tubing material strives to resume or creep back to its original shape. This creeping characteristic may, for example, be evident for one hour. For this reason, a further process step may be included, during which the coupled arrangement is kept at rest for an additional time after initial assembly, either before or after the cutting off, before the coupling is taken into further use.

According to an advantageous form of execution of the method, flexible tubes containing a base of polyethylene or polypropylene may be used. For example, it is preferred to use as polyethylene a material of higher molecular weight or at least of so-called medium density, i.e. a density class of at least 3.

Particular applications of the invention involve couplings with tubes having an outside diameter up to 5 mm. In these applications, the method of the invention is particularly advantageous with respect to its durability and resistance to aging. In addition, in this range of applications the materials used can be permanently deformed simply by manual pulling.

According to a further aspect of the invention, tubes are used whose wall-cross-section is at least equal to the clear cross-section of the passage therethrough.

The coupling itself is characterized in that the bore in the fitting, which may be made of plastic, metal, or the like, is produced with an undersize of about 10% as compared with the outside diameter of the tube. This dimensional indication is important for the reason that it permits the tubing material, which is pulled into the bore undeformed, to remain within the range of its elastic deformation, or at any rate does not leave the range in which it creeps back to its original shape. The tube is so arranged in the bore that it traverses the entire bore. An important characteristic is that the bore be at least five times longer than the outside diameter of the tube.

To produce a coupling of particularly high tensile strength, the bore is advantageously made rough, advantageously with circumferential ruts. These circumferential ruts are filled out in the production of the coupling according to the method of the invention.

A more complete understanding of the invention, along with a further appreciation of its features, will be available from the following detailed description which is made with reference to the attached drawing.

DESCRIPTION OF THE PREFERRED EMBODIMENT

Figure 1:
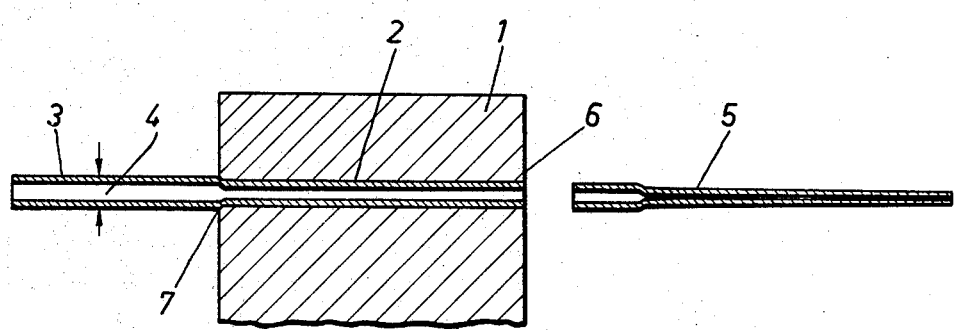
FIG. 1 shows a sectional side view of a coupling with the cut off deformed tube.

FIG. 1 shows a fitting 1 that may be of any desired shape, according to the purpose. This fitting has an internal bore 2, which is at least five times as long as the outside diameter of a tube 3. The unmodified cross-section of tube 3 is shown to the left of the fitting. Compared with the original diameter of the tube at 4, the bore has a cross-section that is smaller by about 10%.

Before introducing the tube 3 into fitting 1, its free end is stretched beyond the elastic limit in order to permanently give it the shape shown at 5 on the right of FIG. 1. This practically filamentous taper is then easily threaded through the bore 2, and the tube is pulled after. As the tube 3 enters the bore, it is snugly squeezed against the bore wall with a pressure resulting from the elasticity and creep properties of the tube material. After complete insertion, the section shown at right in FIG. 1 is cut off flush at the end face 6 of the fitting. There is thus provided a packing-free coupling that is absolutely tight and has not internal surface discontinuities or steps which might impair the flow of a traversing medium therethrough.

Figure 2:
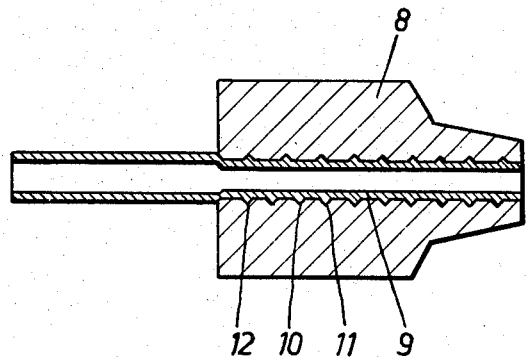
FIG. 2 shows a sectional side view of another embodiment wherein the bore has internal surface disruptions.

According to a further embodiment of the invention, the fitting 8 in FIG. 2 has an internal bore 9 that is designed on the same principles as bore 2, but has circumferential ruts or grooves 10, 11 . . . With this fitting, after introduction of the tube 12, these circumferential grooves are completely filled, so that the strength of the coupling is further increased. The grooves may advantageously have a depth up to 1½% of the outside diameter of the tube.

Both of the illustrated embodiments of the invention excel in tensile strength and although the coupling shown in FIG. 2 may be somewhat stronger, the arrangement of FIG. 1 has been found sufficient for virtually all applications. In effect, the bore of fitting 1 or 8 is lined with the material of the inserted tube 3 or 12, thus the coupling arrangement is not only strong, but provides resistance characteristics to chemicals that are identical to those of the tube material itself.

Although only specific illustrative embodiments of the invention have been shown, it will be clear that modifications may be made. It is intended in the following claims to embrace within the scope of the invention, all changes and modifications which come within the skill of those familiar with this art.

What is claimed is:

1. A method for forming a coupling between a fitting and a smooth walled flexible elastic tube, of uniform diameter comprising forming a bore in said fitting having a diameter smaller than the uncompressed outside diameter of said tubing, stretching an end of said tubing beyond its elastic limit to form a permanently deformed section with a smaller diameter than said bore, passing the deformed section through said bore, and thereafter pulling the undeformed section into said bore until substantially full contact between said undeformed section and the bore is attained.

2. A method according to claim 1, including maintaining the coupling at rest for an additional time after its initial assembly.

3. A method according to claim 1, wherein said tube contains a base of polyethylene.

4. A method according to claim 1, wherein said tube contains a base of polypropylene.

5. A method according to claim 1, wherein the tube has an outside diameter of up to 5 mm.

6. A method according to claim 1, including the initial selection of an elastic tube having an uncompressed diameter substantially 10% greater than the diameter of said bore.

7. A method according to claim 6, including creating surface irregularities in said bore prior to insertion of said tube, said surface irregularities having a depth ranging up to 1½% of the outside diameter of the tube.

8. A method for forming a coupling between a fitting and a smooth walled tube, comprising selecting a flexible elastic tube capable of substantially complete restitution when deformed by 10% of its quiescent outside diameter and subject to permanent deformation when stretched beyond its elastic limit to less than 10% of its quiescent outside diameter, forming a bore in said fitting having a diameter smaller than the uncompressed outside diameter of said tubing, stretching an end of said tubing beyond its elastic limit to form a permanently deformed section with a smaller diameter than said bore, passing the deformed section through said bore, and thereafter pulling the undeformed section into said bore until substantially full contact between said undeformed section and the bore is attained.

References Cited
UNITED STATES PATENTS

| | | | |
|---|---|---|---|
| 2,088,922 | 8/1937 | Porteous | 285—55 |
| 2,290,333 | 7/1942 | Johnson | 285—55 |
| 2,366,814 | 1/1945 | Smith | 285—55X |
| 2,608,501 | 8/1952 | Kimble | 285—55X |
| 3,114,969 | 12/1963 | Roth | 29—450 |
| 3,112,112 | 11/1963 | Wright | 29—451UX |
| 3,490,131 | 1/1970 | Sexton | 29—451X |

CHARLIE T. MOON, Primary Examiner

U.S. Cl. X.R.

285—55